(12) United States Patent
Davis et al.

(10) Patent No.: US 6,354,780 B1
(45) Date of Patent: Mar. 12, 2002

(54) ECCENTRIC BALANCED BLISK

(75) Inventors: Brian Michael Davis; Steven Mark Ballman, both of West Chester; Albert Everett McDaniel; James Edward Gutknecht, both of Cincinnati, all of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/662,966

(22) Filed: Sep. 15, 2000

(51) Int. Cl.$^7$ ................................................. F01D 5/00
(52) U.S. Cl. ........................ 414/146; 416/234; 416/190; 416/193 R; 74/573 R
(58) Field of Search ................................. 416/185, 144, 416/234, 193 R, 239, 190, 244 R, 244 A; 29/889.1, 402.07, 402.08; 74/573 R

(56) References Cited

U.S. PATENT DOCUMENTS

| | | | | |
|---|---|---|---|---|
| 4,835,827 A | * | 6/1989 | Marra | 29/156.8 R |
| 4,836,755 A | * | 6/1989 | Nitsche et al. | 417/368 |
| 5,582,077 A | * | 12/1996 | Agram et al. | 74/573 R |

* cited by examiner

Primary Examiner—Edward K. Look
Assistant Examiner—Ninh Nguyen
(74) Attorney, Agent, or Firm—Andrew C. Hess; Rodney M. Young

(57) ABSTRACT

A blisk includes a disk having a rim from which extends a row of blades. The rim includes axially opposite overhangs one of which includes an arcuate balance land disposed eccentrically to the centerline axis of the disk for balancing the blisk.

31 Claims, 4 Drawing Sheets

ECCENTRIC BALANCED BLISK

BACKGROUND OF THE INVENTION

The present invention relates generally to gas turbine engines, and, more specifically, to balancing of rotors therein.

Gas turbine engines include various rotors in the typical form of bladed disks. Each rotor disk is specifically configured with a radially outer rim from which extends a row of blades. An axially thinner web extends radially inwardly from the rim and terminates in an axially thicker hub having a central bore therein.

The disk is circumferentially continuous and has substantial hoop strength for withstanding the centrifugal loads developed by the blades as they rotate during operation about a longitudinal or axial centerline axis of the disk. The disk shape maximizes the strength thereof while minimizing undesirable weight for effectively supporting the blades over a substantial service life.

The rotor disks have various forms for supporting relatively large fan rotor blades and multiple rows of compressor blades decreasing in size for compressing air during operation. The air is mixed with fuel and ignited for generating hot combustion gases which flow downstream through various rows of turbine blades increasing in size on corresponding rotor disks therefor.

In one common configuration, the rotor disks include either axial-entry dovetail slots through the rim thereof, or a common circumferential-entry dovetail slot which correspondingly receive complementary blade dovetails for retention to the disks. In another common configuration, the blades may be integrally formed with the rim of the disk in a unitary or one-piece construction typically referred to as a blisk which is an acronym for the unitary bl(aded-d)isk.

The advantage of the dovetail construction is the ability to individually manufacture the blades and disk, and permit simple repair thereof by disassembly of the blades from the disk. However, the dovetail construction requires a correspondingly larger disk for withstanding the various pressure and centrifugal loads experienced during operation.

A particular advantage of the blisk construction is that the integral disk may be smaller since no dovetails are used, and the blades are integrally formed around the disk rim. However, this increases repair difficulty since the blades are not readily individually removable from the disk. Minor repairs of the blade may be made in the blisk, but major repair thereof requires removal by cutting of corresponding portions of damaged blades or their complete removal, with the substitution thereof being made by welding or other metallurgical bonding process for achieving the original strength of the blisk.

An additional difficulty in the manufacture of the blisk is balancing thereof. All rotor components in a gas turbine engine must be suitably statically and dynamically balanced for minimizing rotary imbalance loads during operation for reducing vibration. The dovetail disk construction permits the rotor to be initially balanced during manufacture, with the individual blades being separately manufactured and matched in position on the disk for minimizing the resulting imbalance of the assembly thereof. The assembled disk may then be conventionally balanced using various forms of balance corrections.

In contrast, the typical manufacturing tolerances in the manufacture of the individual blades of the blisk result in corresponding variation in the respective mass or weight thereof. This in turn creates an overall imbalance of the blisk which must be suitably corrected.

Conventional balancing machines measure imbalance of the blisk at a suitable speed in terms of an imbalance force vector having magnitude in mass and radius, and at a measured circumferential angular position around the circumference of the blisk relative to any suitable reference point. The measured imbalance may be corrected by either removing blisk material at the angular position of the imbalance vector or by adding additional material diametrically oppositely therefrom, such as at 180° for example.

Material may be removed from identified blades, or in the platform region between blades. Material may also be removed from flanges on corresponding extension shafts of the blisk which are used for carrying torque load thereto from the low pressure turbine of the engine which powers the blisks.

However, identifying suitable locations for removing sufficient mass of material increases the difficulty of the balancing process since material removal may decrease the ultimate strength of the blisk which must be maintained at a suitably high level for ensuring a suitable useful life.

The addition of a suitable amount of material for balancing the blisk presents its own difficulties. It is typically not practical to add material to the blades or disk itself without adversely affecting the strength thereof. Instead, balance correction in the form of discrete balance weights may be added at the mating flanges of the blisk.

Accordingly, it is desired to provide a blisk having an improved balance feature.

BRIEF SUMMARY OF THE INVENTION

A blisk includes a disk having a rim from which extends a row of blades. The rim includes axially opposite overhangs one of which includes an arcuate balance land disposed eccentrically to the centerline axis of the disk for balancing the blisk.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
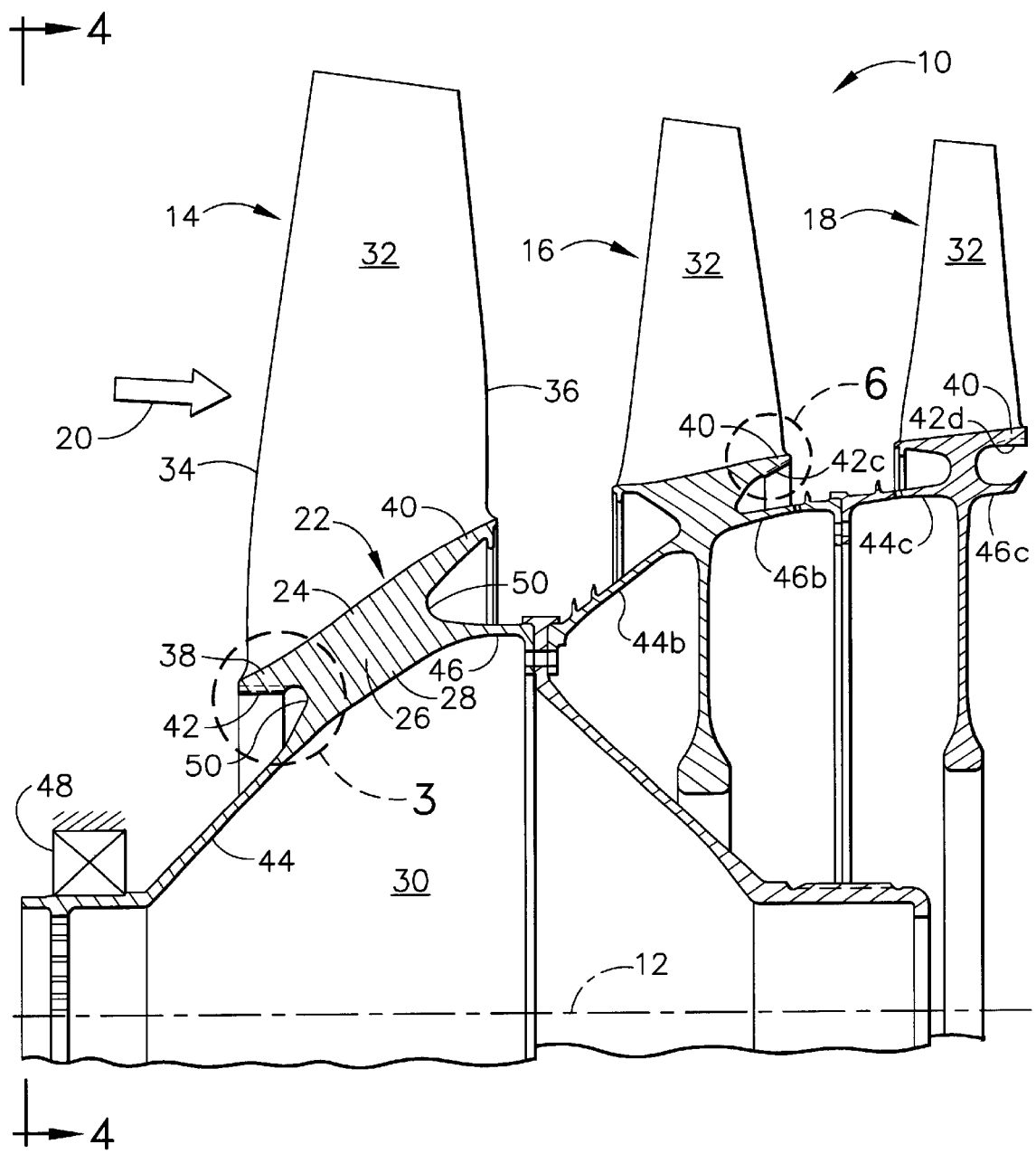
FIG. 1 is a partly sectional, axial elevational view of a three stage fan blisk rotor having eccentric balance lands in accordance with corresponding embodiments of the present invention.

Illustrated in FIG. 1 is a three-stage fan rotor 10 which is axisymmetrical about a longitudinal or axial centerline axis 12 thereof. This exemplary embodiment is configured for a turbofan aircraft gas turbine engine for military applications, and is powered by a low pressure turbine (not shown) suitably joined thereto.

The fan rotor 10 includes first, second, and third blisks 14, 16, 18 which are suitably joined together and powered by the low pressure turbine for compressing ambient air 20 which flows downstream therethrough.

The three blisks are generally similar in construction and the first stage blisk 14 will be described in detail, with the second and third stage blisks 16,18 being similarly configured except as otherwise noted.

The blisk 14 includes an annular rotor disk 22 having an enlarged radially outer rim 24, a narrower web 26 extending radially inwardly therefrom, and a wider radially inner hub 28 defining a center bore 30. The disk is an integral or unitary component, with the rim, web, and hub thereof being disposed concentrically around the centerline axis 12.

A plurality of rotor blades or airfoils 32 extend in a row radially outwardly from the outer surface of the rim 24 in a unitary or one-piece assembly therewith. Such an integral blisk may be conventionally manufactured from a forged blank of high strength superalloy material typically used in gas turbine engine fans and suitably machined by a multi-axis numerically controlled cutting machine or by electrochemical machining (ECM).

A particular advantage of the blisk construction illustrated in FIG. 1 is the ability to minimize the size of the disk 22 while still maintaining sufficient hoop strength capability for carrying the substantial pressure and centrifugal loads experienced by the blades during rotary operation. The rim 24 is sufficiently long in axial width for supporting the blades 32 at their root ends between leading and trailing edges 34,36, and narrows in axial width to the narrower web 26, with the hub 28 then increasing in axial width for accommodating operating loads within acceptable stress limits for ensuring a suitable useful life of the blisk.

In this efficient structural configuration, the rim 24 includes first and second axial overhangs 38,40 on axially opposite sides of the web, which are freely axially cantilevered therefrom.

In accordance with the present invention, at least one of the two overhangs 38,40 includes an arcuate balance land 42 projecting radially inwardly from the underside of the overhang and disposed eccentrically to the disk centerline axis 12 for balancing the entire blisk.

In the exemplary embodiment illustrated in FIG. 1, the rim 24 is conical with an outer surface increasing in diameter between the first overhang 38 at the forward end of the disk to the second overhang at the aft end of the disk. The diameters of the two overhangs are accordingly different from each other with the aft overhang being larger than the forward overhang.

The blisk also includes an annular first or forward shaft 44 extending from a forward side of the hub 28 radially inwardly or inboard from the rim first overhang 38. An annular second or aft shaft 46 extends from an axially opposite aft side of the hub 28 radially inboard of the rim second overhang 40. The two shafts 44,46 are integrally joined to the disk in the unitary construction thereof, and are suitably configured for being mounted in the gas turbine engine.

For example, the forward shaft 44 is in part conical as it extends forwardly from the disk and then transitions into a cylindrical portion which is suitably mounted in a conventional bearing 48 in the engine. Correspondingly, the aft shaft 46 is generally cylindrical and includes an annular flange at its aft end for being mounted to a corresponding forward flange of the second stage blisk 16 at its supporting conical forward shaft in any suitable manner, such as by fastening bolts. The aft shaft 46 is also joined to an aft fan shaft for driving the three-stage blisk assembly as illustrated in FIG. 1.

The corresponding forward and aft shafts of the second and third blisks 16, 18 are designated with the corresponding suffix b, c and are suitably configured for being joined together in series to form the collective three-stage fan rotor suitably driven by the low pressure turbine.

In the exemplary embodiment illustrated in FIG. 1, the balance land 42 is disposed under the rim first overhang 38, with the forward shaft 44 being spaced radially inwardly from the balance land. The forward shaft 44 defines a load bearing arm for carrying reaction forces from the blades into the bearing 48. The balance land 42 is eccentric around both the disk centerline axis 12 and the forward shaft 44, and is structurally uncoupled from the direct loadpath of the forward shaft, while locally maximizing the radial diameter of the balance land for maximizing its balancing effectiveness.

In this embodiment, the balance land 42 is spaced from both shafts 44,46 by the web 26 therebetween, and effectively structurally uncouples the balance land from the loadpath between the blades and shafts effected by the integral disk therebetween.

As shown in FIG. 1, the rim forward overhang 38 is disposed directly below the blade leading edges 34 and is aligned radially therewith. The second overhang 40 is disposed directly below the blade trailing edges 36 and is aligned radially therewith. And, the aft sloping conical rim 24 has a larger outer diameter at the aft overhang than at the forward overhang.

The balance land 42 may be disposed under either the forward or aft overhangs 38,40, or both, and is disposed in most part radially below the corresponding leading and trailing edges of the blades. In this way, the balance land provides effective balancing force without interfering with the structural loadpath. And, the balance land may be located under either overhang or both where space permits and where its effect may be maximized.

A particular advantage of the balance land 42 is its circumferential extension around the underside of the rim overhang which thusly spreads its balancing effect without concentration in any one local region. Furthermore, the balance land neither compromises the strength of the supporting shafts 44 or 46, nor the strength of the disk itself, including the rim 24. And, the balance land 42 introduces minimal dead weight and centrifugal force therefrom which must be carried by the disk 22 during operation.

Figure 2:
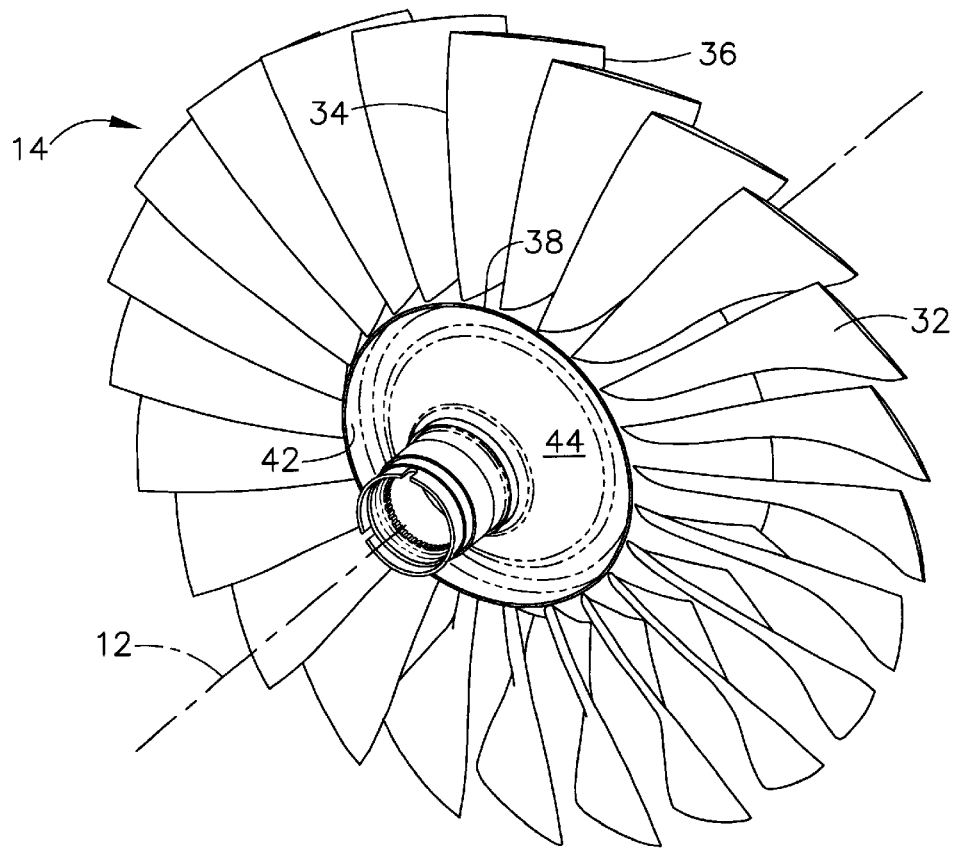
FIG. 2 is an isometric view of the first stage blisk illustrated in FIG. 1 including one form of the eccentric balance land therein.
Figure 3:
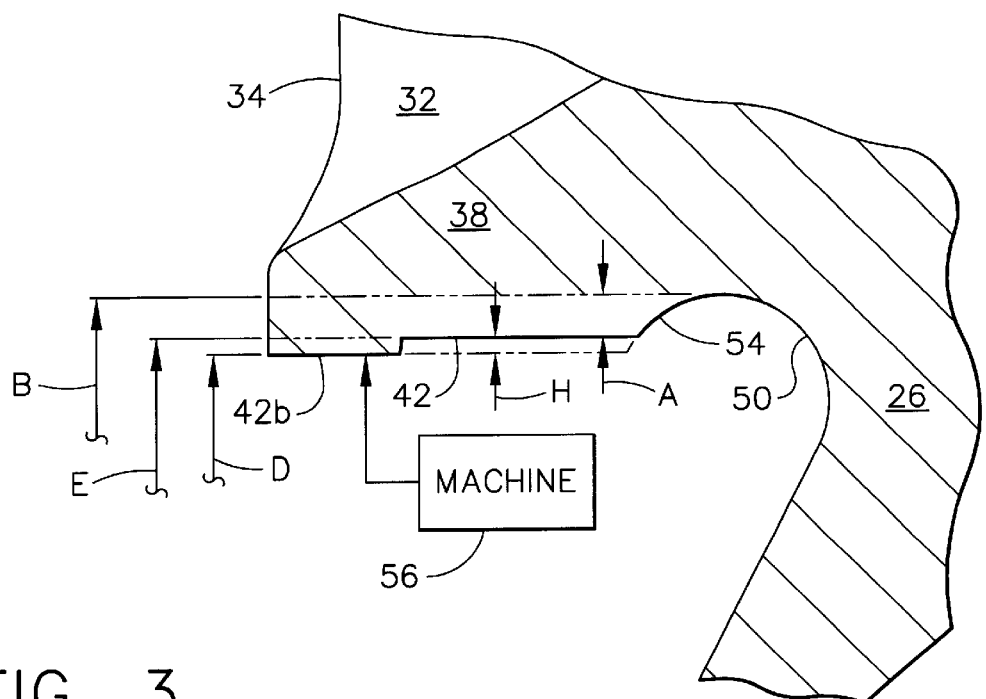
FIG. 3 is an enlarged axial sectional view of the forward overhang of the blisk rim shown in FIG. 1 within the dashed circle labeled 3, and also along the section line 3—3 in FIG. 4, illustrating the formation of one embodiment of the eccentric balance land.
Figure 4:
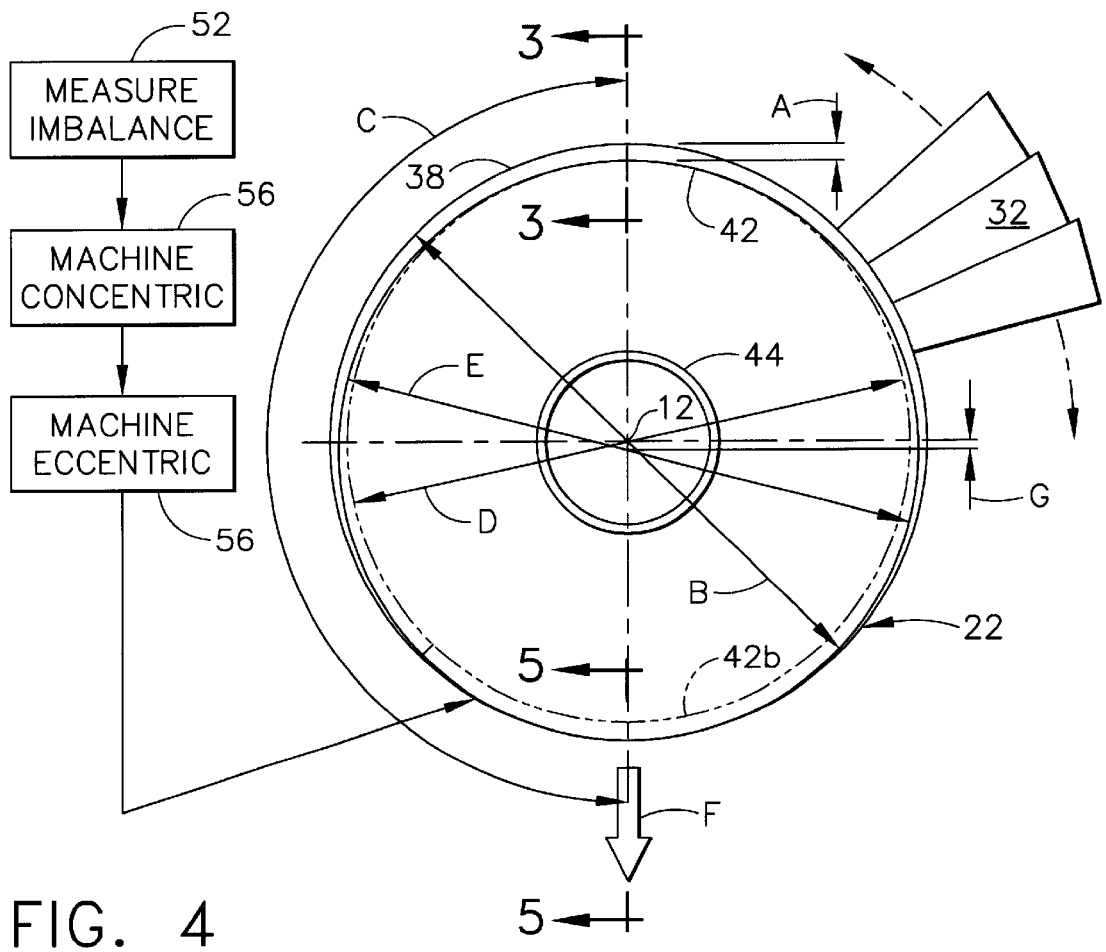
FIG. 4 is a front-facing-aft elevational view of a portion of the first stage blisk illustrated in FIG. 1 and taken along line 4—4 showing schematically in flowchart form an exemplary method of balancing the blisk.

The first blisk 14 is illustrated in isolation in FIG. 2, and includes the balance land 42 blending around the underside of the forward overhang 38. FIG. 3 illustrates a portion of the balance land 42 being formed with the maximum value of its radial thickness A. FIG. 4 illustrates a front view of the balance land 42 which varies in radial thickness circumferentially around the disk rim 24 and, FIG. 5 illustrates the minimum thickness of the balance land 42 being machined where it blends substantially flush with the underside of the forward overhang 38.

Figure 5:
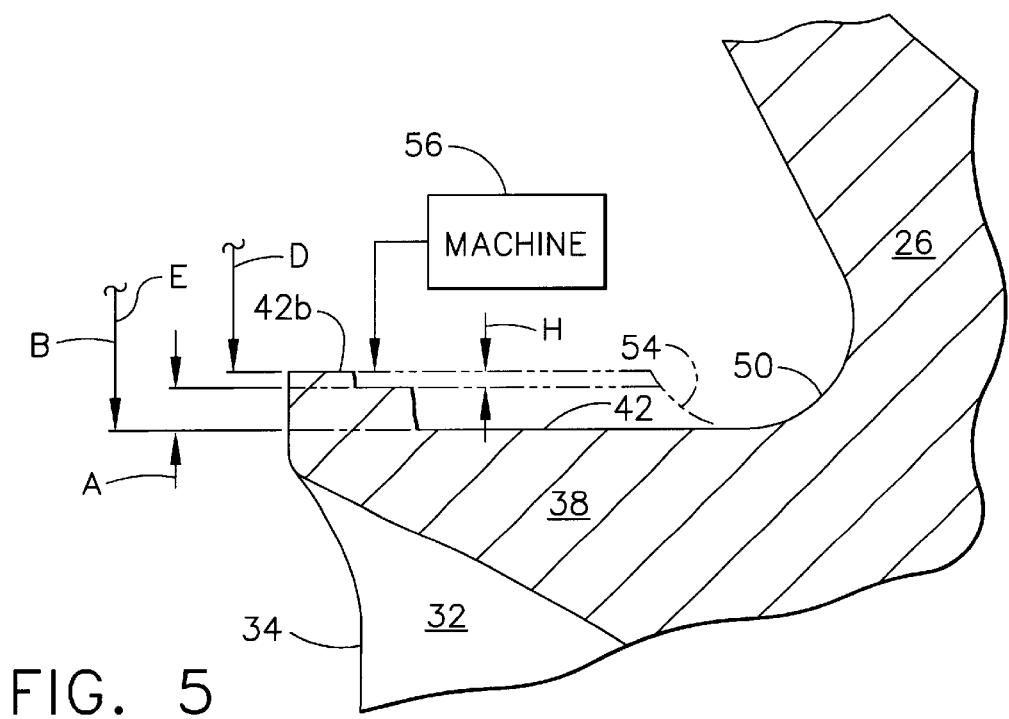
FIG. 5 is an enlarged axial sectional view of the eccentric balance land illustrated in FIG. 4 along line 5—5 corresponding with the angular position of the measured blisk imbalance vector at the exemplary 6 o'clock position.

As illustrated in FIGS. 1, 3, and 5, the rim 24 and corresponding shafts 44,46 join the common web 26 on opposite axial sides thereof at corresponding fillets 50 which have relatively large radii for reducing stress concentration thereat. But for the addition of the balance land 42 itself, the underside of the forward overhang 38 would have a larger inner diameter for smoothly blending with the corresponding fillets without surface discontinuity or steps therebetween.

As shown in FIGS. 3–5, the forward overhang has a nominal inner diameter B representative of the underside of the forward overhang without any material added to form the balance land 42. This reference diameter B is representative of the minimum diameter of the forward overhang having a circumferentially continuous hoop of material which provides hoop strength for the disk.

The balance land 42 is effected by providing additional material projecting radially inwardly from the underside of the forward overhang specifically configured for balancing the particular imbalance force vector F of the blisk as illustrated schematically in FIG. 4.

Accordingly, the eccentric balance land 42 illustrated in FIG. 4 varies in radial thickness A from a maximum thickness diametrically opposite to the imbalance force F being balanced to a minimum thickness blending substantially flush with the fillet in the region of the imbalance force F in the preferred embodiment.

A conventional balancing machine 52 illustrated schematically in FIG. 4 may be used for rotating the blisk for measuring the imbalance force F thereof as represented by a magnitude in mass at a particular radius from the disk centerline, e.g. gram-inches, and at a particular angular position C from a suitable reference point. By introducing eccentricity in the balance land 42, the measured imbalance may be diametrically offset for balancing the entire blisk.

FIG. 3 illustrates the balance land 42 at the 12 o'clock position of FIG. 4, diametrically opposite to the measured imbalance force F at the 6 o'clock position, wherein the thickness A of the balance land is maximum as measured from the reference diameter B, and thusly effects a radially inwardly projecting step 54 at this location of the fillet 50. FIG. 5 illustrates the balance land 42 at the 6 o'clock position of FIG. 4 corresponding with the angular position of the measured imbalance force F wherein the thickness of the balance land is a minimum, and is preferably zero for blending the land substantially flush at the imbalance location and smoothly increasing in thickness on circumferentially opposite sides thereof.

In this way, the balance land 42 is circumferentially continuous around opposite sides of the minimum thickness location thereof and effectively terminates thereat corresponding with the nominal underside of the forward overhang 38 which would otherwise be created without the balance land at all.

The balance land is preferably introduced in the blisk at the maximum practical diameter relative to the disk centerline axis for maximizing its ability to offset measured imbalance with minimal additional mass. Although the balance land illustrated in FIG. 1 could instead be introduced under the larger diameter aft overhang 40, this is impractical in this specific design in view of a conventional vibration damper located in this region. Accordingly, the balance land 42 is introduced under the smaller diameter forward overhang 38, and is preferably cylindrical in configuration extending generally parallel to the disk centerline axis.

As shown in FIG. 3, the effect of the balance land 42 may be maximized by maximizing its area within the limited space provided by the rim overhang. In this preferred location, the balance land extends continuously in the axial direction from the exposed forward edge or face of the disk rim under the forward overhang to engage the forward end of the fillet 50 adjoining the web 26. And, as illustrated in FIG. 4, the balance land also extends circumferentially continuously from its maximum thickness to its minimum thickness where it terminates and blends with the underlying rim overhang.

FIGS. 3–5 illustrate an exemplary method of balancing the blisk using a preferred form of the eccentric balance land 42. The blisk itself is initially produced to its final configuration, within typical manufacturing tolerances, including the full row of blades and supporting disk and integral shafts. The initial blisk is also provided with additional material under the overhang for creating the eccentric balance land. Any conventional machine tool 56, such as a multi-axis numerically controlled machine tool, may be used for initially configuring the balance land prior to effecting the specific eccentric configuration thereof.

More specifically, the blisk is firstly machined to produce an initial balance land 42b which is annular and preferably concentric with the overhang of the disk rim. The initial balance land 42b is illustrated in various detail in FIGS. 3–5. The initial balance land has a radial thickness A measured relative to the nominal inner diameter B of the rim overhang, which would otherwise be configured without the addition of the balance land.

The initial balance land 42b is preferably machined concentric with the disk centerline axis so that in its initial form it introduces little if any imbalance to the entire blisk.

The blisk is then mounted in the balancing machine 52 and rotated to speed for measuring imbalance thereof as represented by the resulting imbalance vector F illustrated in FIG. 4 typically expressed in gram-inches at the specific angular position C. In the exemplary embodiment illustrated in FIG. 4, the measured imbalance F is located at the 6 o'clock position of the blisk, and thusly requires correction diametrically opposite thereto effectively at the 12 o'clock position.

By machining the initial annular balance land 42b eccentrically relative to the disk centerline axis, the remaining mass of the eccentric balance land 42 may be diametrically offset relative to the measured imbalance force F for offsetting that imbalance and effectively balancing the entire blisk.

In a preferred embodiment illustrated in FIG. 4, the initial balance land 42b has an initial inner diameter D, and the eccentric balance land has a final inner diameter E which is eccentrically offset from the disk centerline axis by a predetermined eccentric offset G.

By machining the concentric initial balance land 42b to a larger diameter to form the eccentric balance land 42, the center of mass of the remaining eccentric balance land may be precisely offset diametrically from the measured imbalance force vector F to balance the blisk. The eccentric balance land extends circumferentially inside the inner diameter of the rim overhang and introduces no hoopwise stress concentration and maintains the complete circumferential hoop continuity of the rim overhang for maintaining its full hoop strength for supporting the blades during rotary operation.

In the preferred embodiment illustrated in FIGS. 3–5, the inner diameter of the balance land increases from its initial concentric diameter D to its final larger diameter E, and the eccentric offset G is preferably equal to about half the increase in inner diameter, which is half the difference of E & D. In this way, the step 54 illustrated in FIG. 3 is created at the maximum thickness of the balance land 42, and the step is eliminated at the minimum thickness of the balance land illustrated in FIG. 5 where the balance land terminates and blends flush to the underside of the rim overhang 38. As shown in FIG. 4, the thickness A of the balance land 42 varies or decreases from its maximum thickness at the 12 o'clock position to the zero minimum thickness at the 6 o'clock position along both circumferentially opposite sides of the balance land.

This configuration provides many advantages including maintaining the hoop strength of the rim overhang under which the balance land is introduced. Tapering the balance land to minimum zero thickness ensures the lightest configuration of the remaining balance land for reducing the dead weight thereof which must be carried by the disk during rotary operation.

In a blisk specifically configured for operation in a gas turbine engine fan as opposed to operation in the low pressure turbine thereof, the stepless blending illustrated in FIG. 5 provides a drainage path for any moisture or other fluids accumulating within the pocket under the rim overhang and permits their drainage by centrifugal force.

The eccentric balance land 42 is also hidden along the underside of the rim overhang and does not affect aerodynamic performance of the outer surface of the rim, and does not affect structural integrity of the disk rim, and does not affect the loadpath through the disk to the supporting shafts.

Furthermore, by introducing the balance land below either of the rim overhangs, the balance feature is located relatively close to the plane of unbalance for thusly correcting imbalance with a minimum of force moment in the blisk.

As illustrated in FIGS. 3 and 5, the forward fillet 50 is machined at the web 26 between the junction of the rim first overhang 38 and the forward shaft. The initial balance land 42b is firstly machined concentrically about the disk centerline axis with a substantially constant radial thickness A which creates the radially inwardly facing step 54 at the fillet 50. Then, the initial balance land 42b is machined to its larger diameter E and with the eccentric offset G to substantially eliminate the radial step 54 at one circumferential portion of the fillet such as the 6 o'clock position illustrated in FIGS. 4 and 5.

In a preferred embodiment, the effective balance correction of the eccentric balance land may be analytically determined in advance for a range of balance land maximum thicknesses. For example, the maximum value of the balance land thickness A may range up to about 50 mils (1.27 mm), and the cooperating eccentric offset G may be half that maximum thickness, or 25 mils (0.64 mm) in this example. The eccentric balance land provides an offset mass which may be represented in the same units as the imbalance force, such as gram-inches at an angular position represented by its symmetry plane.

In a typical example, the measured imbalance vector will have a magnitude within the balancing capability of the initial balance land. For example, the imbalance force F may have a value of 100 gram-inches at the 6 o'clock position illustrated in FIG. 4. And, a 50 mil balance land may have a balancing magnitude substantially greater than the imbalance force.

Accordingly, in the preferred embodiment illustrated in FIGS. 3 and 5, the initial annular balance land 42b may be firstly machined to a suitably larger value of its diameter D by initially removing excess material having a radial thickness H. In this way, the remaining maximum thickness A of the annular initial balance land 42b is initially reduced so that the resulting balance correction will match the measured imbalance force F. The imbalance force F may then be redetermined in the balancing machine to ensure its accuracy after the thickness of the initial balance land is reduced.

Then, the initial balance land is re-machined from its larger value diameter D to the correspondingly larger diameter E with the corresponding offset G representing half the increase in the inner diameter of the balance land. The resulting eccentric balance land 42 will then introduce a correction force substantially matching the measured imbalance force F for diametrically offsetting that imbalance and effectively balancing the entire blisk.

In the exemplary embodiment illustrated in FIGS. 1–5, the balance land 42 is introduced under the forward overhang 38 for effectively balancing the entire first stage blisk 14.

Alternatively, the balance land could be introduced under the aft overhang 40 of the blisk where space permits. Since a blade damper (not illustrated) is located in this region of the first blisk 14, the balance land 42 is instead located under the forward overhang. However, in the second stage blisk 16 illustrated in FIG. 1, the aft overhang 40 permits the introduction of the balance land, designated 42c, therebelow.

Figure 6:
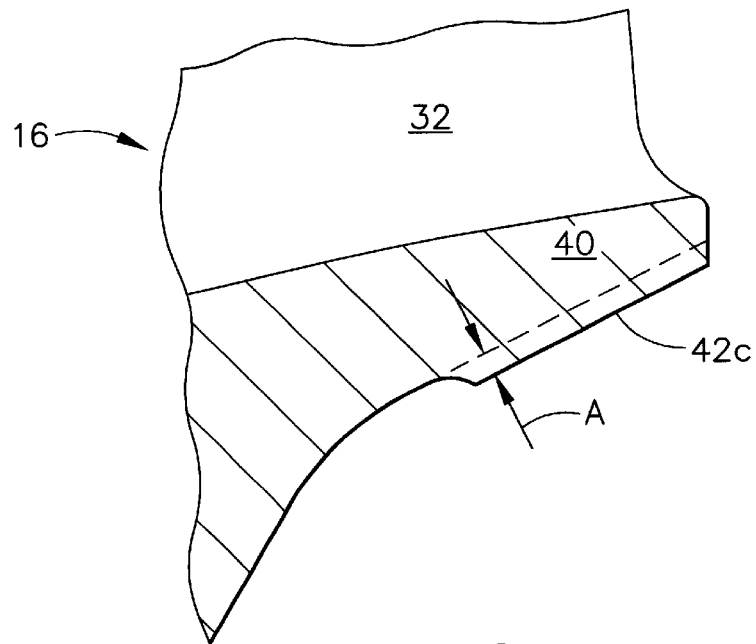
FIG. 6 is an enlarged axial sectional view of the rim aft overhang for the second stage blisk illustrated in FIG. 1 within the dashed circle labeled 6 in accordance with another embodiment of the present invention.

FIG. 6 illustrates this alternate embodiment in more detail wherein the aft overhang 40 is conical in both its outer and inner surfaces. And, the balance land 42c is correspondingly conical for matching the contour of the inner surface of the aft overhang for maintaining a substantially constant thickness of the balance land over the axial extent thereof. However, the conical balance land 42c is otherwise similar to the cylindrical balance land 42 described above and is similarly disposed eccentrically relative to the disk centerline axis for introducing a correction balance force for offsetting the measured imbalance of the second stage blisk 16.

Since the conical balance land 42c is introduced at the larger diameter aft overhang 40 in the second blisk 16 as opposed to its smaller diameter forward overhang, the balancing effect of the land is greater, and its size may be correspondingly reduced for further minimizing the dead weight of the balance land feature itself when introduced into the blisk.

FIG. 1 also illustrates another cylindrical form of the eccentric balance land, designated 42d, under the aft overhang 40 of the third stage blisk 18. In view of the larger fillet construction of the third blisk 18, the cylindrical balance land 42d may be formed eccentrically with the disk centerline axis without any steps at the fillet around the full circumference of the disk.

Another advantage of introducing the balance land in its various forms along the underside of either the disk forward or aft overhangs is the ability to more readily repair the blisk after extended service life, and rebuild the balance land for rebalancing the repaired blisk without adversely degrading the strength of the blisk.

Figure 7:
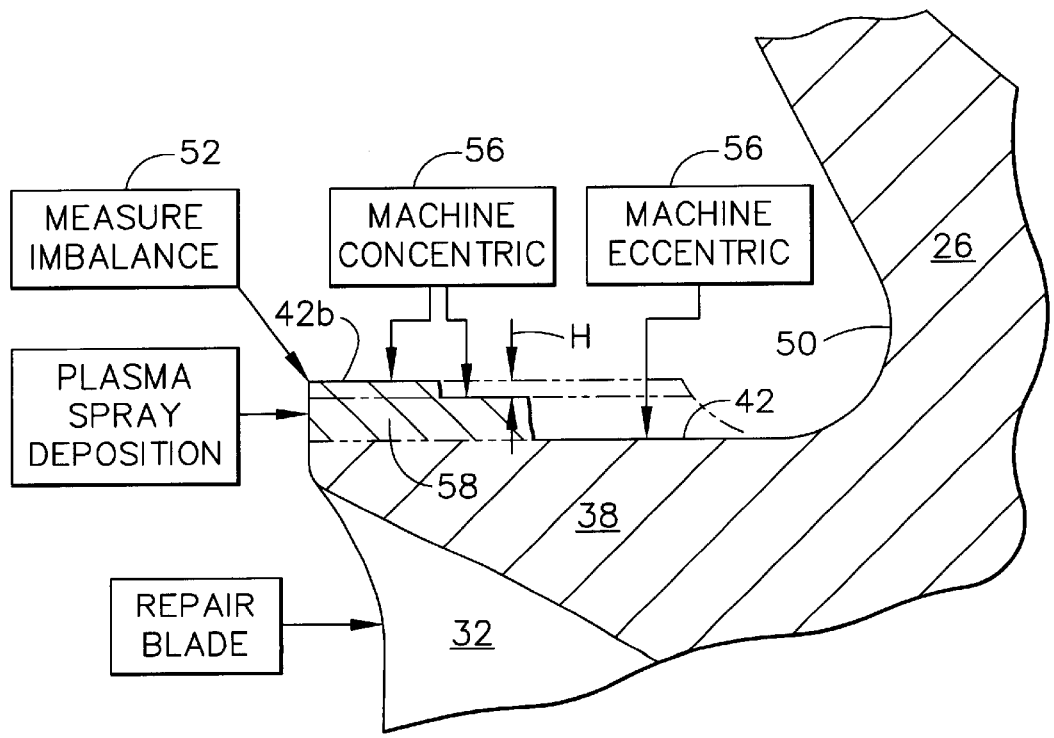
FIG. 7 is an enlarged sectional view, like FIG. 5, of an exemplary method of repairing the blisk in accordance with another feature of the present invention.

FIG. 7 illustrates the same portion of the first stage blisk illustrated in FIG. 5 undergoing a repair procedure in accordance with another embodiment of the present invention. One or more of the blades 32 may be damaged during service by foreign object damage (FOD) for example. At least one of the blades 32 may be repaired in any suitable manner such as by removing part or all of the blade and replacing such part or entire blade with a substitute suitably metallurgically bonded in place by welding or other suitable technique. The so repaired blisk must then be suitably rebalanced prior to being returned to service.

This may be effected by rebuilding the balance land 42 concentrically with the disk rim at the corresponding overhang 38 so that a new form of the eccentric balance land may be re-effected.

The repaired blisk with the rebuilt concentric initial balance land 42b may then be balanced in the same manner described above by measuring the imbalance and then machining the rebuilt balance land 42 for effecting the eccentric correction therefrom.

In the preferred embodiment illustrated in FIG. 7, the balance land may be rebuilt to a suitably thick initial size by plasma spray deposition of additional metal material 58 along the underside of the rim overhang for decreasing the inner diameter thereof. Any form of conventional plasma spray deposition may be used for rebuilding the balance land without adversely affecting the material properties or strength of the disk. And, suitable heat treatment of the blisk may be used to improve the material properties, if desired.

Then, the rebuilt balance land may be machined concentrically with the rim to the suitable annular initial balance land form 42b prior to re-balancing the repaired blisk.

Again, the so repaired blisk with the rebuilt initial balance land 42b may then be rebalanced in the same manner described above by measuring the imbalance force and machining the initial balance land to the required eccentric form for offsetting the measured imbalance.

The eccentric balance land described above in various forms is readily introduced in the otherwise conventional blisks for use at any suitable location in the gas turbine engine. The eccentric balance land is located at a relatively large diameter along the underside of either rim overhang for maximizing its effectiveness while minimizing the amount of mass needed for effecting the balance correction.

The balance land extends circumferentially around the rim in a thickness varying from maximum to minimum values and smoothly blends with the underside of the rim and introduces no hoopwise stress concentrations in the blisk. And, the balance land is structurally uncoupled from the loadpath between the blades and the supporting shafts and does not decrease the strength thereof. The additional load provided by the introduction of the balance land itself is readily carried through the disk without a significant increase in stress therein during rotary operation.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A blisk comprising:
an annular disk including a rim, a web, and a hub disposed concentrically around an axial centerline axis;
a row of blades extending radially outwardly from said rim; and
said rim includes first and second overhangs on axially opposite sides of said web, and one of said overhangs includes an arcuate balance land projecting radially inwardly therefrom and disposed eccentrically to said disk centerline axis for balancing said blisk.

2. A blisk according to claim 1 further comprising an annular shaft integrally joined to said disk radially inwardly from said rim and spaced from said balance land.

3. A blisk according to claim 2 wherein said balance land varies in radial thickness circumferentially around said rim.

4. A blisk according to claim 3 wherein said rim and shaft join said web at a fillet, and said balance land varies in radial thickness from a maximum thickness effecting a radial step at said fillet to a minimum thickness blending substantially flush with said fillet.

5. A blisk according to claim 4 wherein said balance land is circumferentially continuous around opposite sides of said minimum thickness thereof and terminates thereat.

6. A blisk according to claim 3 wherein:
said rim is conical, and said first and second overhangs thereof have different diameters;
said shaft defines a first shaft extending from a first side of said hub inboard of said rim first overhang;
an annular second shaft extends from an opposite side of said hub inboard of said rim second overhang; and
said balance land is spaced from both said first and second shafts by said web therebetween.

7. A blisk according to claim 6 wherein:
said blades include leading and trailing edges;
said rim first overhang is disposed below said blade leading edges;
said rim second overhang is disposed below said blade trailing edges at a diameter greater than said diameter of said rim first overhang; and
said balance land is disposed under at least one of said rim first and second overhangs in most part radially below said corresponding leading and trailing edges of said blades.

8. A blisk according to claim 7 wherein said balance land is disposed under said rim first overhang.

9. A blisk according to claim 7 wherein said balance land is disposed under said rim second overhang.

10. A blisk according to claim 7 wherein said balance land is cylindrical.

11. A blisk according to claim 7 wherein said balance land is conical.

12. A blisk according to claim 7 wherein said balance land extends axially from an exposed edge of said rim to said fillet.

13. A method of balancing said blisk according to claim 3 comprising:
machining said blisk initially with an annular balance land under said rim;
measuring imbalance of said blisk; and
machining said initial balance land eccentrically to offset said measured imbalance and balance said blisk.

14. A method according to claim 13 further comprising:
firstly machining said initial balance land concentrically with said rim; and
secondly machining said initial balance land to a larger inner diameter, with an eccentric offset equal to about half the increase in said inner diameter.

15. A method according to claim 14 further comprising:
machining a fillet at said web between said rim and said shaft;

firstly machining said initial balance land with a substantially constant radial thickness effecting a radial inward step at said fillet; and secondly machining said initial balance land to substantially eliminate said radial step at one circumferential portion of said fillet.

16. A method of balancing said blisk according to claim 1 comprising:

machining said blisk initially with an annular balance land under said rim;

measuring imbalance of said blisk; and machining said initial balance land eccentrically to offset said measured imbalance and balance said blisk.

17. A method of repairing said blisk according to claim 1 comprising:

repairing at least one of said blades;

rebuilding said balance land concentric with said rim;

measuring imbalance of said repaired blisk; and machining said rebuilt balance land eccentrically to offset said measured imbalance and balance said repaired blisk.

18. A method according to claim 17 further comprising rebuilding said balance land by plasma spray deposition of additional material thereon for decreasing the inner diameter thereof.

19. A method according to claim 18 further comprising machining said rebuilt balance land concentrically with said rim prior to balancing said repaired blisk.

20. A blisk comprising:

an annular disk including a conical rim, a web, a hub, a first shaft extending from a first side of said hub, and a second shaft extending from an opposite side of said hub all disposed concentrically around an axial centerline axis;

a row of blades extending radially outwardly from said rim, with each blade including leading and trailing edges; and said rim includes a first overhang surrounding said first shaft, a second overhang surrounding said second shaft, and one of said overhangs includes an arcuate balance land projecting radially inwardly therefrom and disposed eccentrically to said disk centerline axis for balancing said blisk.

21. A blisk according to claim 20 wherein said balance land varies in radial thickness circumferentially around said rim.

22. A blisk according to claim 21 wherein said rim and shafts join said web at corresponding fillets, and said balance land varies in radial thickness from a maximum thickness effecting a radial step at one of said fillets to a minimum thickness blending with said one fillet.

23. A blisk according to claim 22 wherein:

said rim first overhang is disposed below said blade leading edges;

said rim second overhang is disposed below said blade trailing edges at a diameter greater than a diameter of said rim first overhang; and said balance land is disposed under at least one of said rim first and second overhangs in most part radially below said corresponding leading and trailing edges of said blades.

24. A blisk according to claim 23 wherein said balance land is cylindrical and is disposed under said rim first overhang.

25. A blisk according to claim 23 wherein said balance land is conical and is disposed under said rim second overhang.

26. A blisk according to claim 23 wherein said balance land blends substantially flush with said one fillet.

27. A blisk according to claim 23 wherein said balance land extends axially from an exposed edge of said rim to said one fillet, and is circumferentially continuous around opposite sides of said minimum thickness thereof and terminates thereat.

28. A method of balancing said blisk according to claim 20 comprising:

machining said blisk initially with an annular balance land under said rim;

measuring imbalance of said blisk; and machining said initial balance land eccentrically to offset said measured imbalance and balance said blisk.

29. A method according to claim 28 further comprising:

firstly machining said initial balance land concentrically with said rim; and secondly machining said initial balance land to a larger inner diameter, with an eccentric offset equal to about half the increase in said inner diameter.

30. A method of repairing said blisk according to claim 20 comprising:

repairing at least one of said blades;

rebuilding said balance land concentric with said rim;

measuring imbalance of said repaired blisk; and machining said rebuilt balance land eccentrically to offset said measured imbalance and balance said repaired blisk.

31. A method according to claim 30 further comprising:

rebuilding said balance land by plasma spray deposition of additional material thereon for decreasing the inner diameter thereof; and machining said rebuilt balance land concentrically with said rim prior to balancing said repaired blisk.

\* \* \* \* \*